(12) United States Patent
Chen et al.

(10) Patent No.: US 12,342,084 B2
(45) Date of Patent: Jun. 24, 2025

(54) OPERATION METHOD OF OPTICAL SENSOR (71) Applicant: SENSORTEK TECHNOLOGY CORP., Hsinchu County (TW)

(72) Inventors: Si-Yuan Chen, Hsinchu County (TW); Cheng-Feng Liu, Hsinchu County (TW)

(73) Assignee: Sensortek Technology Corp., Zhubei (TW)

( * ) Notice: Subject to any disclaimer, the term of this patent is extended or adjusted under 35 U.S.C. 154(b) by 46 days.

(21) Appl. No.: 18/067,057

(22) Filed: Dec. 16, 2022

(65) Prior Publication Data

US 2023/0328391 A1 Oct. 12, 2023

Related U.S. Application Data (60) Provisional application No. 63/265,505, filed on Dec. 16, 2021.

(51) Int. Cl.
*H04N 23/745* (2023.01)
*G01J 1/42* (2006.01)

(52) U.S. Cl.
CPC .......... *H04N 23/745* (2023.01); *G01J 1/4204* (2013.01)

(58) Field of Classification Search
CPC ..... H04N 23/745; H04N 23/73; G01J 1/4204; G01J 1/18; G01J 2001/184; G01J 1/44; G01J 2001/4426; Y02B 20/40
See application file for complete search history.

(56) References Cited

U.S. PATENT DOCUMENTS

2020/0053273 A1* 2/2020 Kim .................. H04N 23/745

\* cited by examiner

*Primary Examiner* — Yogesh K Aggarwal
(74) *Attorney, Agent, or Firm* — Rosenberg, Klein & Lee (57) ABSTRACT

An operation method of an optical sensor comprising receiving an ambient light by a light-sensing device. Record a signal generated by the light-sensing device after receiving the ambient light by a operation unit. A flicker frequency of the ambient light is determined by the operation unit. A signal operation parameter is set according to the flicker frequency, and the signal operation parameter comprises a sampling time difference, which is the starting time interval of two corresponding integration time periods of a plurality of integration time periods. Furthermore, the light-sensing device and the operation unit start the calculation of the intensity of the ambient light, so that the flicker component of an ambient light source may be eliminated from the light sensing result to produce a stable sensing result.

8 Claims, 9 Drawing Sheets

OPERATION METHOD OF OPTICAL SENSOR

FIELD OF THE INVENTION

The present application generally relates to an operation method of an optical sensor, and particularly to a method for signal operation and signal control of the optical sensor.

BACKGROUND OF THE INVENTION

Optical sensors implemented by optical sensing technologies are applied massively to many applications. For example, an ambient light sensor (ALS) may be applied to electronic products for sensing the intensity of ambient light. The ambient-light sensing result may be used by electronic products for implementing important functions such as adjusting display brightness or setting camera parameters.

Figure 1:
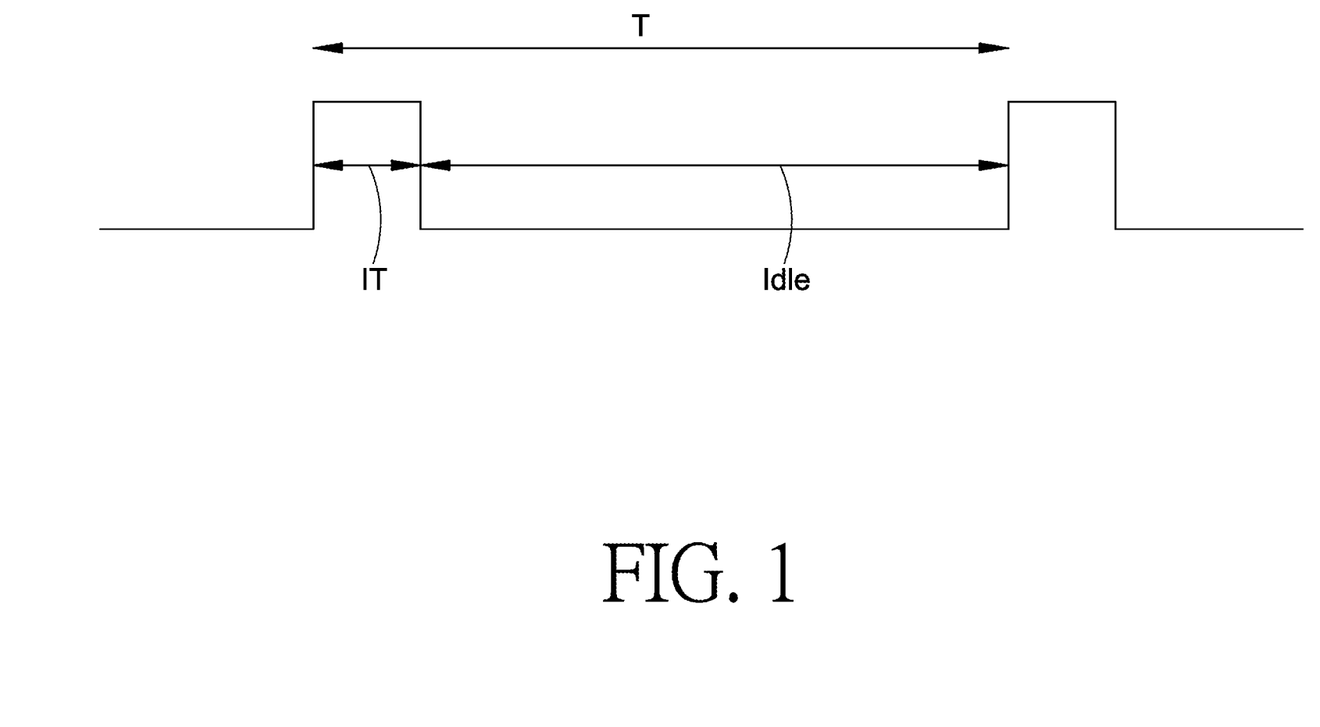
FIG. 1 shows an operation timing diagram of the optical sensor according to the prior art.
Figure 2:
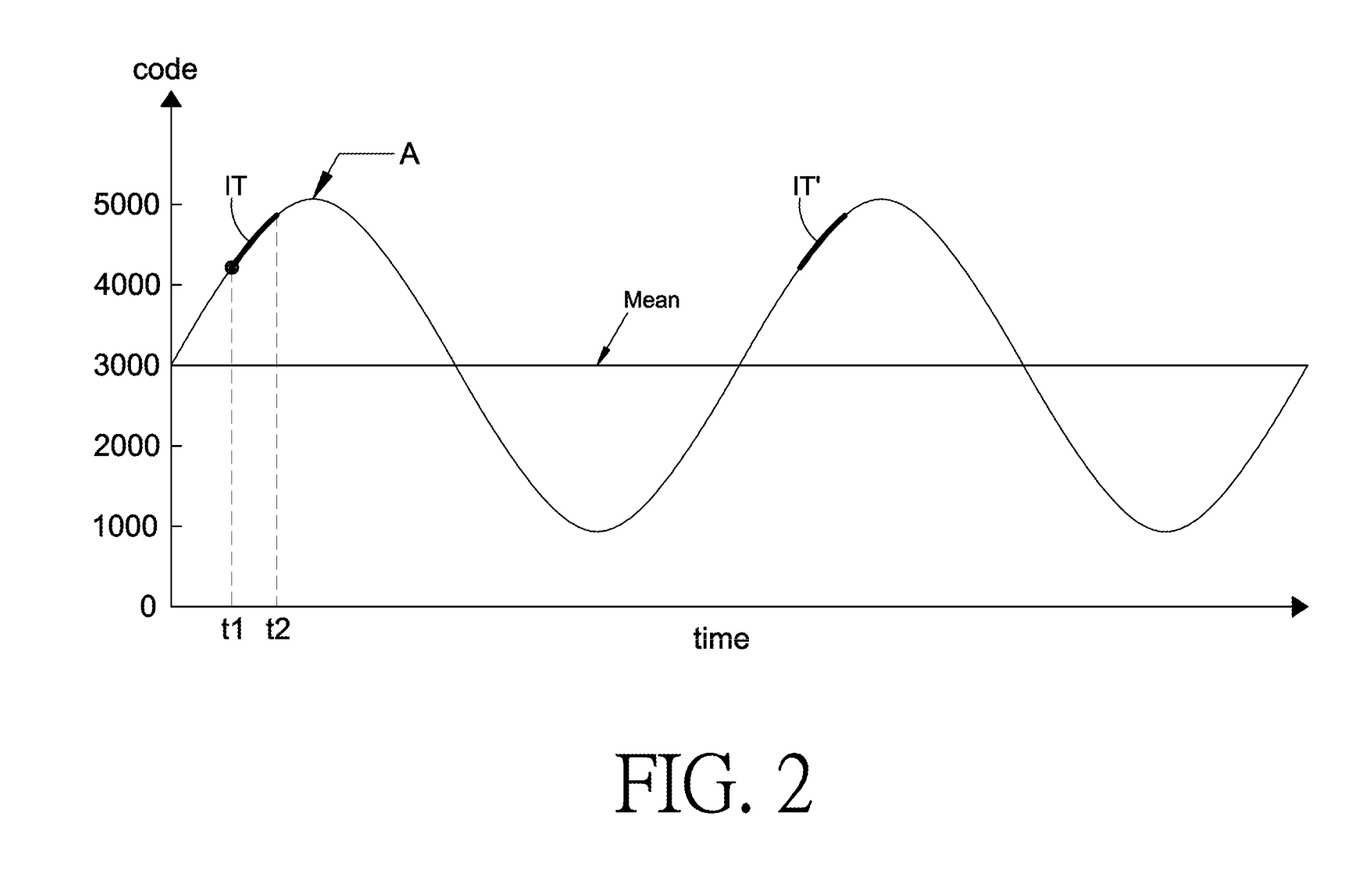
FIG. 2 shows a schematic diagram of the integration time of the optical sensor and the flicker of ambient light according to the prior art.

As shown in FIG. 1, in each sensing cycle T of the ambient light sensor according to the prior art, there are an integration time IT and an idle time "Idle". In the integration time IT, the ambient light sensor will execute an analog-to-digital conversion. The analog signal generated by a light-sensing device (such as a photodiode, PD) upon receiving light is converted into a digital signal as an ambient-light sensing result through operations like integration and decoding. Nonetheless, as shown in FIG. 2, if an ambient light source "A" is a light source supplied by AC power, such as a fluorescent lamp, the luminance will vary and result in the flicker of the ambient light source "A". The flicker of the ambient light source "A" may be roughly expressed by a sine wave with an average luminance "Mean". For convenience, assume that the ambient light is mainly contributed by the ambient light source "A" and ignore other light sources. Thereby, the influence by the flicker of the ambient light source "A" may be focused. The other parts of the specifications are based on the same assumption. In a sensing cycle, if the start time T1 and the stop time T2 of the integration time IT fall within the time segment with the ambient light source "A" higher than the average luminance "Mean", the ambient-light sensing result given by integration will contain a higher ambient light source "A" component. Contrarily, if the integration time IT falls within the time segment with the ambient light source "A" lower than the average luminance "Mean", the ambient-light sensing result given by integration will contain a lower ambient light source "A" component. Then, the ambient-light sensing result will be interfered by the flicker of the ambient light source "A" and may be resulted in generating unstable sensing results.

Practically, the sensing results of multiple sensing cycles may be averaged for reducing the influence of the flicker of the ambient light source "A". Nonetheless, more operations are required for the ambient-light sensing results and thus delaying the response time for ambient light sensing. In addition, the accuracy of the sensing result cannot be guaranteed. For example, even the sensing results within the two integration times IT, IT' are averaged, the effect of reducing the influence of the flicker of the ambient light source "A" is not obvious.

Accordingly, the present application provides an operation method of optical sensor for further reducing the quantified error caused by ambient-light flicker and hence improving the problem of inaccurate ambient light sensor.

SUMMARY OF THE INVENTION

An objective of the present application is to provide an operation method of optical sensor. By decomposing integration time into even integration time segments and setting the time interval of the integration time segments according to the flicker frequency, the flicker components of the ambient light in the light sensing results may be cancelled out for generating stable sensing results. Thereby, the accuracy of the optical sensor may be improved.

According to an embodiment of the present application, an operation method of optical sensor is disclosed. The method comprises a light-sensing device receiving an ambient light and an operation unit receiving a signal generated by the light-sensing device after receiving the ambient light; the operation unit obtaining a flicker frequency of the ambient light; setting signal operation parameters according to the flicker frequency, the operation parameters comprising a sampling-time difference, and the sampling-time difference is the time interval between the start times of two corresponding integration time segments among the even integration time segments; and using the light-sensing device and the operation unit to start an intensity calculation of the ambient light.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

Figure 3:
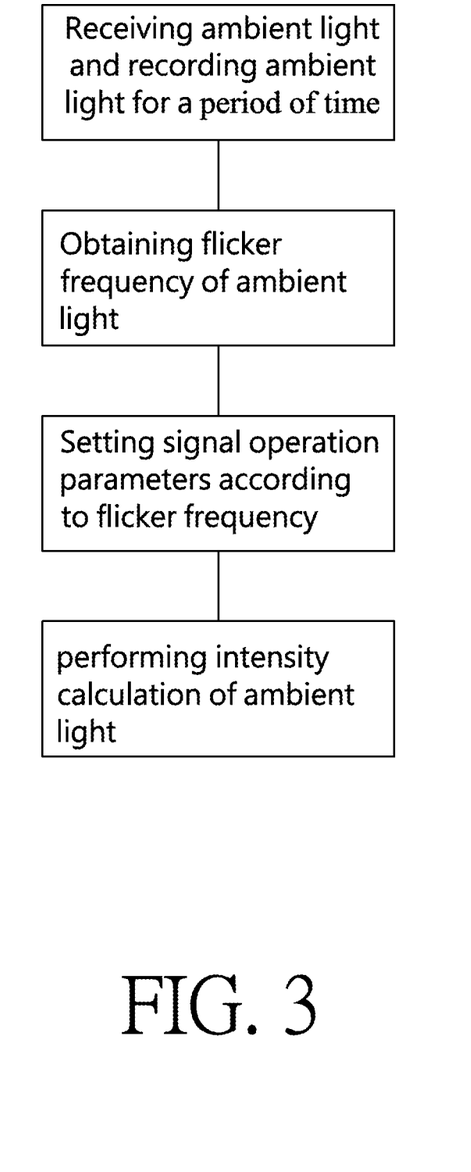
FIG. 3 shows a flowchart of the operation method of optical sensor according to an embodiment of the present application.

First, please refer to FIG. 3, which shows a flowchart of the operation method of optical sensor according to an embodiment of the present application. The operation method of optical sensor according to the present embodiment of the present application may be applied to controlling the architecture of the optical sensor 2 shown in FIG. 4. The optical sensor 2 is formed by a general integrated circuit chip. In addition, the optical sensor 2 may be disposed in an electronic device 1.

Figure 4:
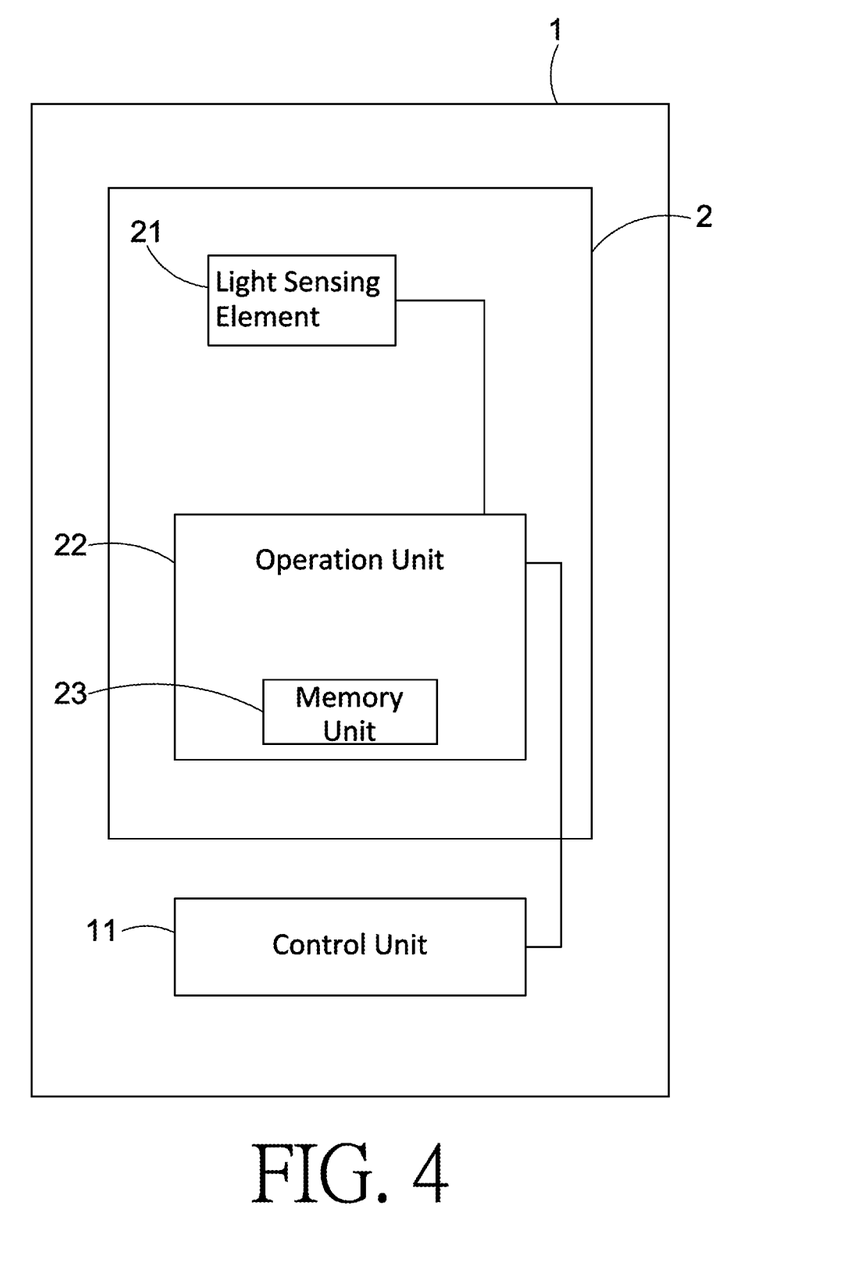
FIG. 4 shows a schematic diagram of the architecture of the optical sensor according to an embodiment of the present application.

According to an embodiment of the present application, the operation method of optical sensor comprises:

A light-sensing device 21 of the optical sensor 2 receives ambient light and an operation unit 22 records the signal generated by the light-sensing device 21 after receiving the ambient light.

The operation unit 22 obtains a flicker frequency of the ambient light. To be specific, if the ambient light contains the ambient light source "A" from the fluorescent lamp supplied by an AC power source as described in the prior art, the ambient light received by the light-sensing device 21 for a period of time will exhibit intensity variation in a specific frequency caused by the influence of the flicker of the ambient light source "A". Then, the operation unit 22 may operate the signal generated by the light-sensing device 21 for obtaining the flicker frequency of the ambient light source "A".

In practice, there are many operation methods for obtaining the flicker frequency of the ambient light source "A". For example, the analog signal generated by the light-sensing device 21 may be compared and operated to calculate the flicker frequency. Alternatively, the analog signal may be converted to digital form before calculating the flicker frequency. Since the related operations are not the focus of the present application, the details will not be described. Nonetheless, it is noteworthy that in other applications of the present field, the electronic device 1 described above might contain information of the flicker frequency of the ambient light. For example, the electronic device 1 might be connected to the electrical grid as well. Alternatively, the electronic device 1 might store the frequency of the electrical grid. Under such circumstances, the operation unit 22 might only need to detect if the ambient light received by the light-sensing device 21 is influenced by the flicker. Then, the control unit 11 of the electronic device 1 may receive the corresponding information for obtaining the flicker frequency of the ambient light. No real calculation is required to obtain the flicker frequency.

Next, set signal operation parameters according to the flicker frequency. The operation parameters comprise a sampling-time difference. The details will be described later.

After setting the signal operation parameters, start the light-sensing device 2 for starting the calculation of the ambient-light intensity.

Figure 5:
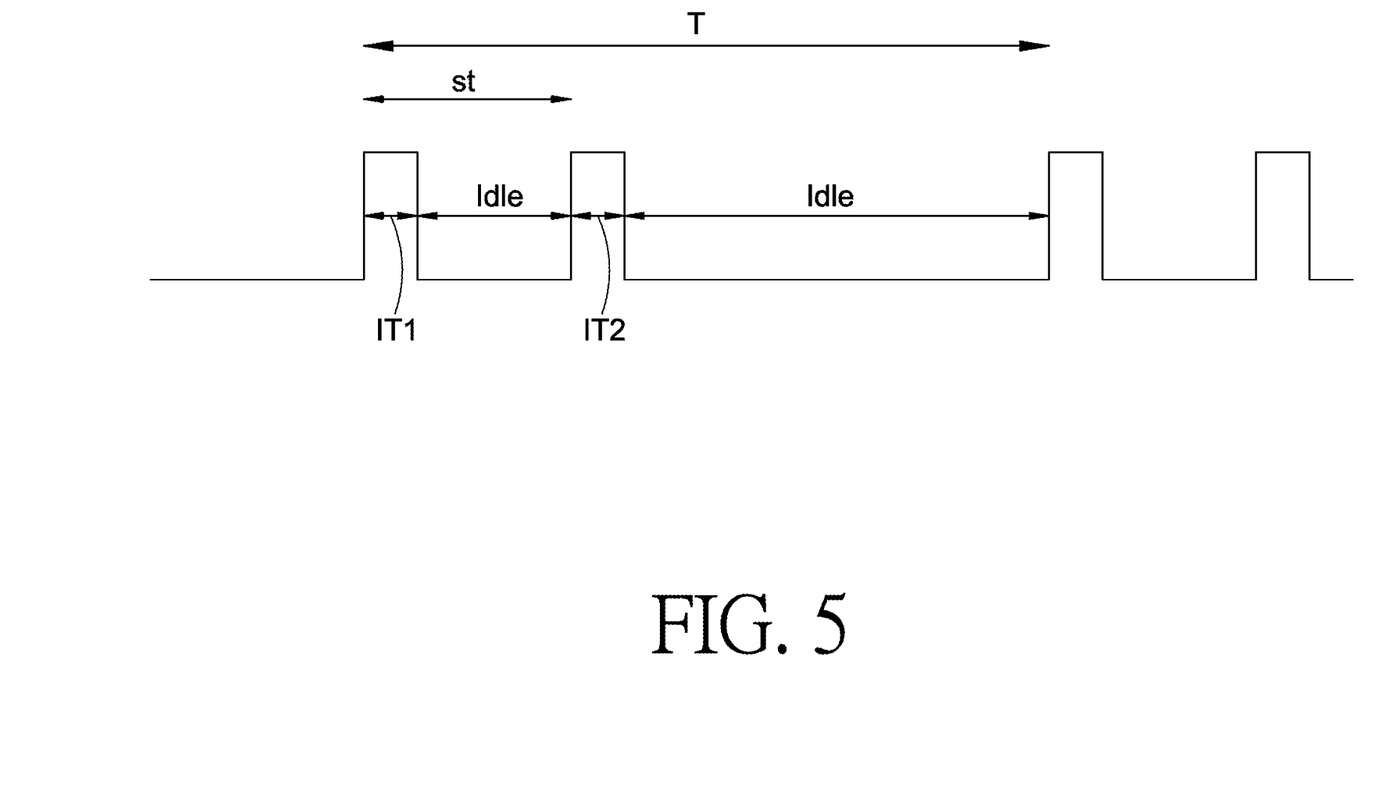
FIG. 5 shows an operation timing diagram of the operation method of optical sensor according to an embodiment of the present application.

Please refer to FIG. 5. In the following, how to set the signal operation parameters according to the flicker frequency will be illustrated. Compared to only one integration time IT in each sensing cycle T according to the prior art, according to the first embodiment of the present application, an existing integration time IT may be decomposed into even integration time segments, such as the first integration time segment IT1 and the second integration time segment IT2 in the figure. The interval between the start times of the first integration time segment IT1 and the second integration time segment IT2 is a sampling-time difference "st", which is determined according to the flicker frequency of the ambient light.

Figure 6:
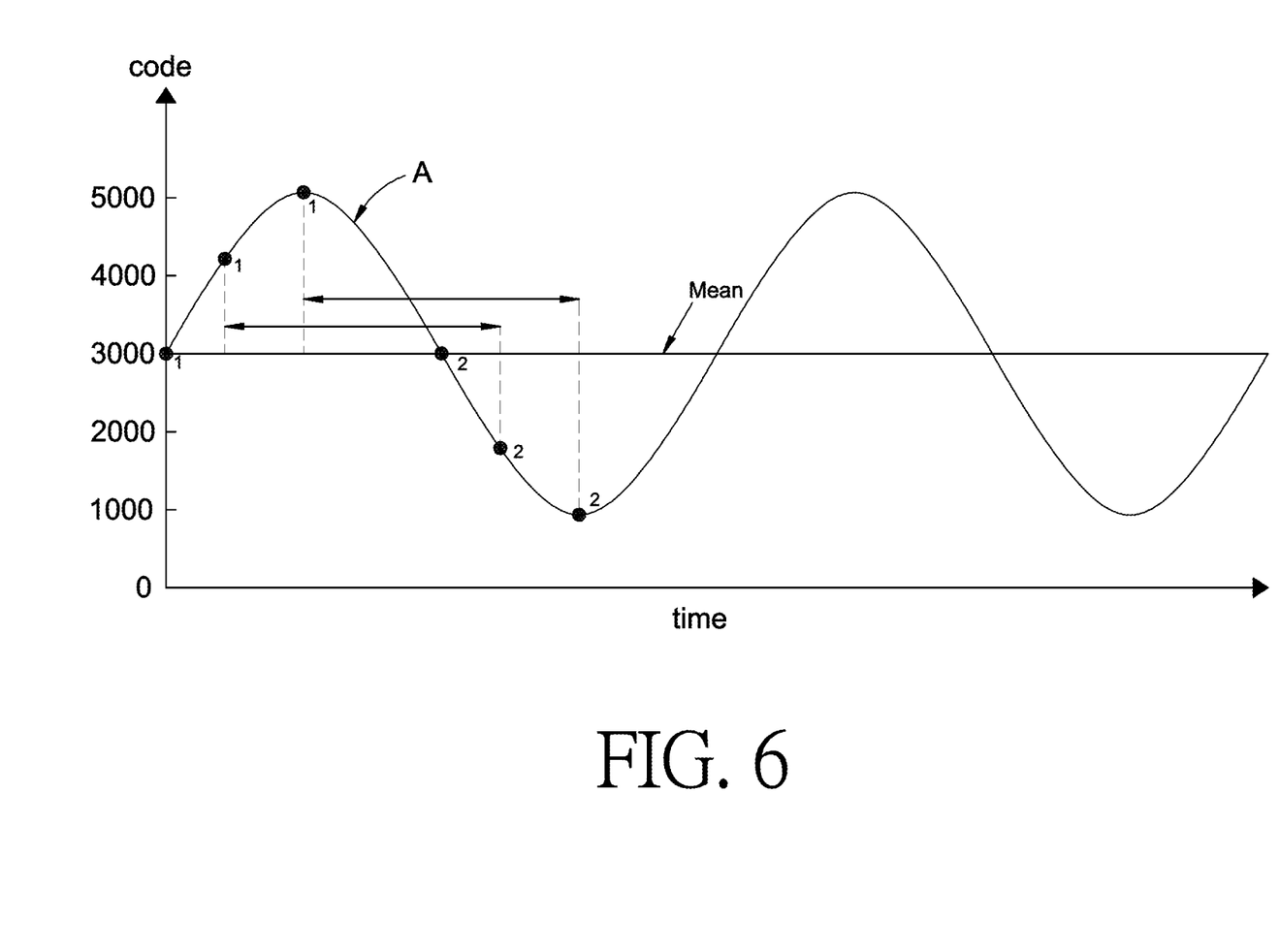
FIG. 6 shows a schematic diagram of the relationship between the flicker of ambient light and the sampling-time difference according to an embodiment of the present application.

Please refer to FIG. 6. If the flicker of an ambient light source "A" is roughly represented by a sine wave, then the differences to the average luminance "Mean" of the ambient light source "A" for two data points with a 180-degree phase difference (such as any pair of the data points 1, 2) are approximate. That is to say, by adding the values of two data points, the flicker of the ambient light source "A" will be cancelled out. In addition, once the frequency of the sine wave is known, the time interval of two data points with the 180-degree phase difference as described above may be deduced and set as the sampling-time difference accordingly. For example, assume the frequency of the electrical grid in the region is 60 Hz. In general, the electrical grid will be full-wave rectified before being supplied to the ambient light source "A". Thereby, the flicker frequency of the ambient light source "A" is 120 Hz, meaning that a flicker cycle of the ambient light source "A" is 1/120=8.33 ms. Then, it is known that the time interval of two data points with the 180-degree phase difference is approximately 8.33/2=4.17 ms. Likewise, in the region with the frequency of the electrical grid being 50 Hz, this time interval is approximately (1/100)/2=5 ms. However, the above examples are only simple examples. In practice, it varies depending on the type of the ambient light source "A" and the conditions of the power source.

Figure 7:
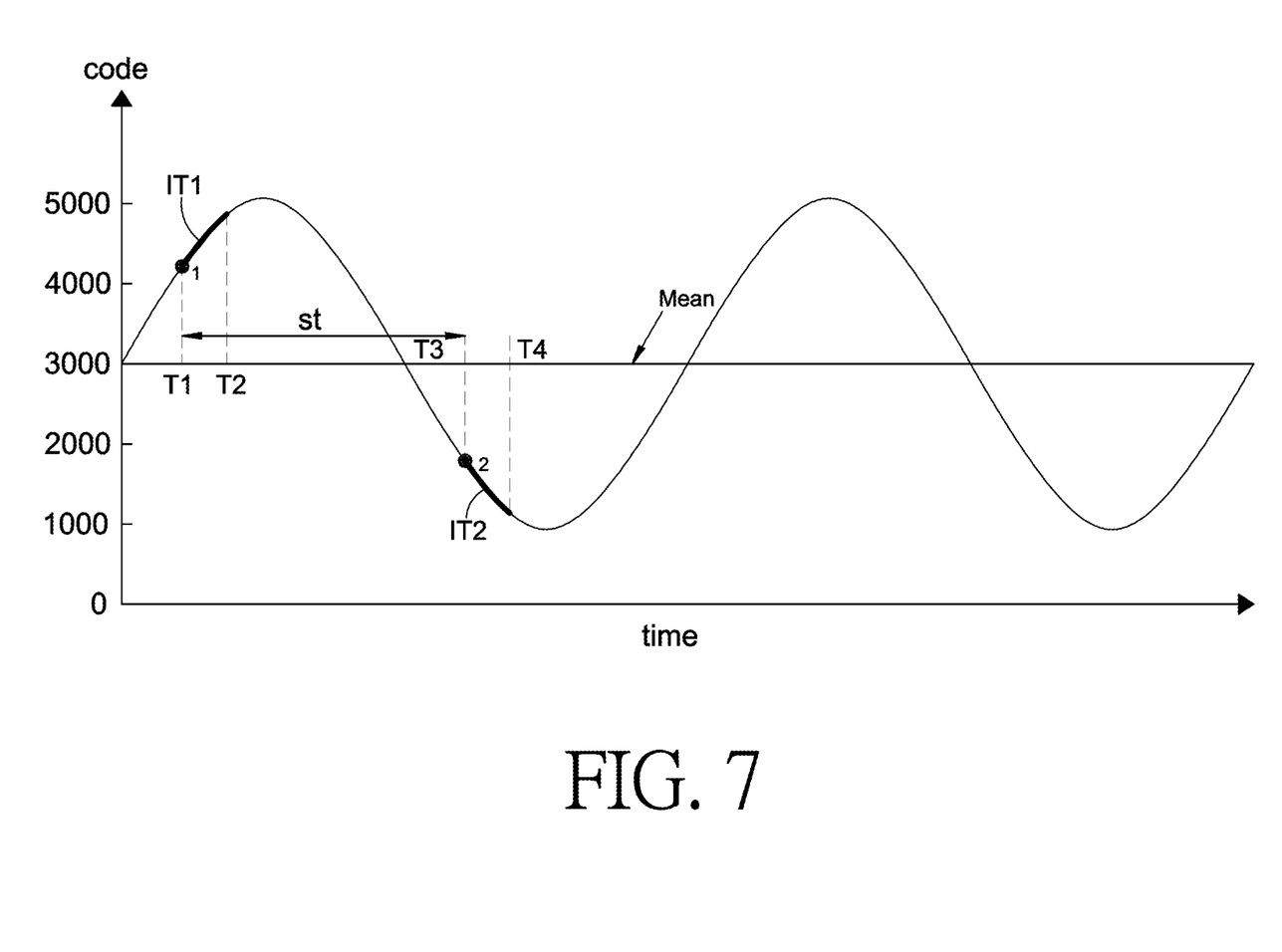
FIG. 7 shows a schematic diagram of the integration time of the optical sensor and the flicker of ambient light according to the first embodiment of the present application.

Please refer to FIG. 7. If the sampling-time difference is set to approximately 4.17 ms according to the flicker frequency 120 Hz of the ambient light, there will be an approximately 4.17 ms time interval between the start time T1 of the first integration time segment IT1 and the start time IT2 of the second integration time segment IT2. Besides, the durations of the first integration time segment IT1 and the second integration time segment IT2 may be identical, which makes the time interval between the stop time T2 of the first integration time segment IT1 and the stop time T2 of the second integration time segment IT2 be approximately 4.17 ms as well. In other words, the difference between each data point in the first integration time segment IT1, and its corresponding data point approximately 4.17 ms apart in the second integration time segment IT2, is similar in comparison to the average luminance "Mean" of ambient light source "A".

Accordingly, after setting the signal operation parameters according to the flicker frequency, the calculation of the ambient-light intensity may be started. For example, according to the first embodiment of the present application, two integration operations for the first integration time segment IT1 and the second integration time segment IT2 are performed. The results of the two integration operations are added up to give Equation (1) below:

$$\text{code} = \int_{T1}^{T2} \frac{V_m \sin(t) dt}{2\pi} + \int_{T3}^{T4} \frac{V_m \sin(t) dt}{2\pi} \quad (1)$$

where "code" is the reading of the ambient-light intensity sensing result; and "Vm" is the maximum luminance of the ambient light source "A".

Because there is the sampling-time difference "st" between the first integration time segment IT1 and the second integration time segment IT2, the addition of the results of the two integration operations may cancel out the flicker of the ambient light source "A", thus giving a reading close to the average luminance "Mean" of the ambient light source "A" and producing stable sensing results. In contrast, if the method according to the prior art as shown in FIG. 2 is adopted, the result of the integration operation in the integration time IT as described above is Equation (2) shown below:

$$\text{code} = \int_{t1}^{t2} \frac{V_m \sin(t) dt}{2\pi} \quad (2)$$

Because the integration time IT in FIG. 2 is located within the region with the ambient light source "A" higher than the average luminance "Mean", the ambient-light sensing result given by integration will definitely contain higher components of the ambient light source "A". In other words, the sensing result produced by Equation (2) will be greater than the reading of the sensing result produced by Equation (1). Contrarily, if the integration time IT is located within the region with the ambient light source "A" lower than the average luminance "Mean", the sensing result produced by Equation (2) will be smaller than the reading of the sensing result produced by Equation (1). Thereby, the operation method according to the embodiment of the present application may obviously improve the stability of the ambient-light sensing result significantly and the influence by the flicker of the ambient light source "A" may be lowered effectively.

More importantly, to exercise the operation method of optical sensor accosting to the embodiment of the present application, no additional system resource should be consumed, and no sensing condition should be changed. Specifically, according to the embodiment of the present application, the integration results of multiple integration time segments are added up to give the sensing result. No secondary operation on the ambient-light sensing result is required. Thereby, the response time for ambient light sensing will not be delayed. Furthermore, by dividing the existing integration time IT into the first integration time segment IT1 and the second integration time segment IT2, the duration of the integration time IT may be controlled to be identical to the sum of the durations of the first integration time segment IT1 and the second integration time segment IT2, namely, $(t2-t1)/2=T2-T1=T4-T3$. That is to say, if the duration of the integration time IT according to the prior art is 2 ms, the durations of the first integration time segment IT1 and the second integration time segment IT2 according to the embodiment of the present application may be 1 ms, respectively. Thereby, compared with the prior art, the operation method of optical sensor according to the embodiment of the present application does not result in adding an additional integration time. Besides, the sensing results obtained by Equations (1) and (2) may be compared with each other directly without any more conversion. It means that the operation method of optical sensor according to the embodiment of the present application may be operated as an independent function and coexist with the operation method according to the prior art in the architecture of the optical sensor 2. A user may determine whether to start the operation method of optical sensor according to the embodiment of the present application by his/her own conditions. For example, the operation unit 22 may only start the operation method of optical sensor according to the embodiment of the present application when the ambient light received by the light-sensing device 21 is indeed influenced by flicker.

Alternatively, the architecture of the optical sensor 2 may adopt the operation method of optical sensor according to the embodiment of the present application all the time. Even though the ambient light received by the light-sensing device 21 is not influenced by flicker, the sensing result produced by the operation method of optical sensor according to the embodiment of the present application may be close to the sensing result according to the prior art. Because the integration time is decomposed into the first integration time segment IT1 and the second integration time segment IT2, the influence of noises may be further smaller.

On the other hand, as shown in FIG. 4, the operation unit 22 of the optical sensor 2 may be further coupled to a memory unit 23, which may comprise a static random access memory (SRAM) or register of other types, for storing the required parameters, such as the flicker frequency or the sampling-time difference, for performing the operation method of optical sensor according to the embodiment of the present application.

According to the first embodiment as described above, two integration time segments (the first integration time segment IT1 and the second integration time segment IT2) are used as an example for the even integration time segments. Nonetheless, in practice, the flicker of the ambient light source "A" might not be an ideal sine wave and some minor error might occur. Under this circumstance, the integration time IT may be decomposed into more integration time segments (for example, 4, 6, 8, 10, 12) for reducing the error owing to nonideal conditions. Take FIG. 8 for example. According to the second embodiment of the present application, the existing integration time IT may be decomposed into the first integration time segment IT1, the second integration time segment IT2, the third integration time segment IT3, and the fourth integration time segment IT4 as shown in the figure. The time interval between the start time T1 of the first integration time segment IT1 and the start time T3 of the third integration time segment IT3 is the sampling-time difference "st"; the time interval between the start time T2 of the second integration time segment IT2 and the start time T4 of the fourth integration time segment IT4 is also the sampling-time difference "st". Thereby, by adding up the operation results in the first integration time segment IT1, the second integration time segment IT2, the third integration time segment IT3, and the fourth integration time segment IT4 still may cancel out the flicker of the ambient light source "A". In addition, by increasing the number of integration time segments, the component of the ambient light source "A" in the sensing result will approach the average luminance "Mean" more closely. Similar to the previous description, if the duration of the integration time IT according to the prior art is 2 ms, the operation method of optical sensor according to the second embodiment of the present application may set the durations of the first integration time segment IT1, the second integration time segment IT2, the third integration time segment IT3, and the fourth integration time segment IT4 to be 0.5 ms, respectively.

Figure 8:
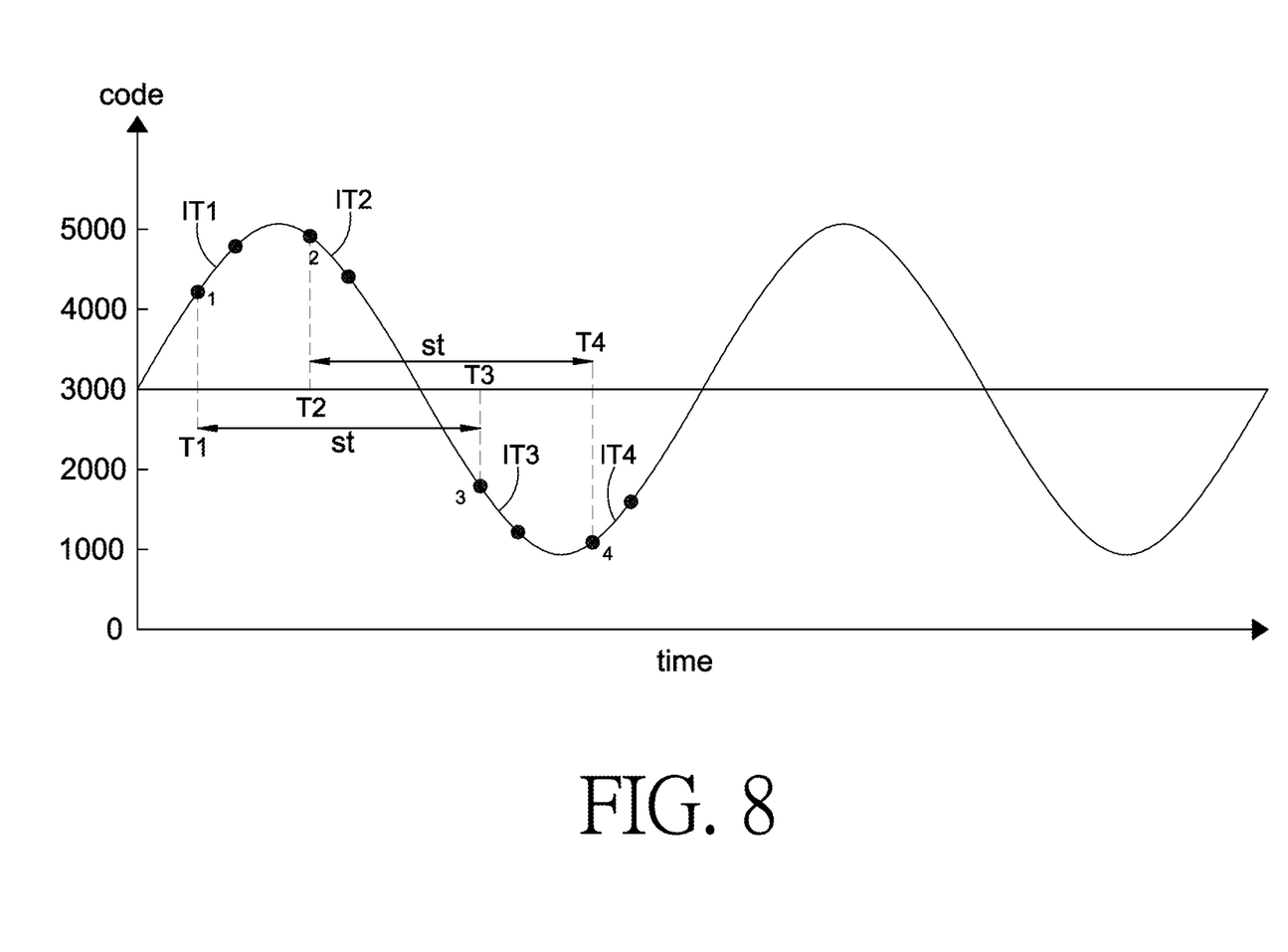
FIG. 8 shows a schematic diagram of the integration time of the optical sensor and the flicker of ambient light according to the second embodiment of the present application.

Preferably, the even integration time segments are distributed uniformly in the flicker cycle of the ambient light source "A". For example, if the first integration time segment IT1, the second integration time segment IT2, the third integration time segment IT3, and the fourth integration time segment IT4 will be completed in a flicker cycle (namely, 360 degrees of phase) of the ambient light source "A", the first integration time segment IT1 and the second integration time segment IT2 preferably differ by $180/2=90$ degrees in phase. Thereby, since the first integration time segment IT1 and the third integration time segment IT3 differ by 180 degrees in phase and the second integration time segment IT2 and the fourth integration time segment IT4 differ by 180 degrees in phase as well, the second integration time segment IT2 and the third integration time segment IT3 will differ by $180/2=90$ degrees in phase and the third integration time segment IT3 and the fourth integration time segment IT4 will differ by $180/2=90$ degrees in phase. Consequently, the first integration time segment IT1, the second integration time segment IT2, the third integration time segment IT3, and the fourth integration time segment IT4 will be distributed uniformly in a flicker cycle and the sensing result may thus reflect the real variation in luminance more accurately. Besides, the circuit for controlling the optical sensor 2 may be simplified. Likewise, according to another embodiment of the present application, there are six integration time segments in a flicker cycler of the ambient light source "A". Preferably, two adjacent integration time segments differ by 180/3=60 degrees in phase. The allocation of the integration time may be simplified as the following Equation (3):

$$\text{phase difference} = \frac{360°}{n} \quad (3)$$

where n is the number of integration time segments to be completed in a flicker cycle of the ambient light source "A".

Figure 9:
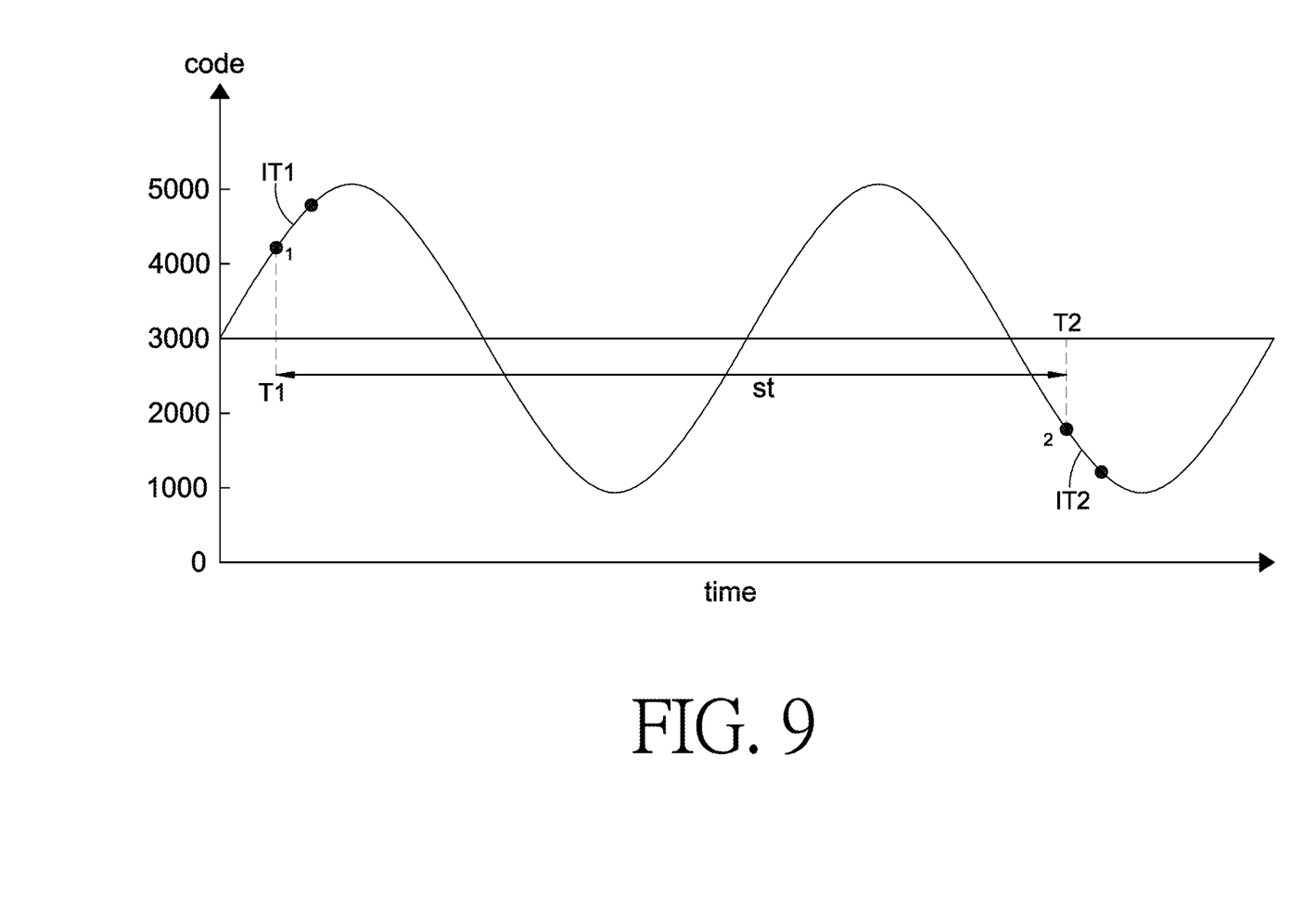
FIG. 9 shows a schematic diagram of the integration time of the optical sensor and the flicker of ambient light according to the third embodiment of the present application.

Moreover, according to the above embodiments, although the first integration time segment IT1 and the second integration time segment IT2 (or comprising the third integration time segment IT3 and the fourth integration time segment IT4) are executed sequentially in a flicker cycle of the ambient light source "A", in practice, there are other variations according to the operation method of optical sensor according to the present application. For example, according to the third embodiment of the present application, the duration of a sensing cycle T comprises multiple flicker cycles of the ambient light source "A", as shown in FIG. 9. Assuming that the ambient light source "A" does not change significantly in a short time, the two data points 1, 2 with phase difference 180+360=540 degrees in phase for a sine wave will have approximate difference from the average luminance "Mean" of the ambient light source "A". Thereby, by calculating the time interval of two data points with 540 degrees of phase difference, the sampling-time difference "st" may be set. For example, if the flicker frequency of the ambient light source "A" as described above is 120 Hz, it means that a flicker cycle of the ambient light source "A" is 1/120=8.33 ms. Then, the time interval for two data points with 540 degrees of phase difference in the sine wave will approximately be (8.33/2)*3=12.5 ms. Thereby, the sampling-time difference "st" is approximately set to be 12.5 ms. To conclude, according to different embodiments of the present application, the sampling-time difference "st" set according to the flicker frequency may be expressed as Equation (4) below:

$$st = \frac{1}{f} \times \left(N + \frac{1}{2}\right) \quad (4)$$

where f is the flicker frequency of the ambient light source "A"; the reciprocal of f is a duration of a flicker cycle; and N is a natural number.

To sum up, according to the operation method of optical method of the present application, the integration time is decomposed into even integration time segments, and the time interval between integration time segments may be set according to the flicker frequency. Then, the flicker component of the ambient light sensed by the optical sensor may be cancelled out to generate stable sensing results. Thereby, the embodiments according to the present application undoubtedly may improve the accuracy of optical sensors.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. An operation method of optical sensor, comprising:
 a light-sensing device receiving an ambient light and an operation unit recording a signal generated by said light-sensing device after receiving said ambient light;
 said operation unit obtaining a flicker frequency of said ambient light according to said recorded signal;
 setting signal operation parameters according to said flicker frequency, said operation parameters comprising a sampling-time difference, and said sampling-time difference being a time interval between the start times of two corresponding integration time segments among even integration time segments; and
 using said light-sensing device and said operation unit to start an intensity calculation of the ambient light;
 wherein in the said even integration time segments, if n integration time segments of said even integration time segments is completed in a flicker cycle of said ambient light source, any two adjacent integration time segments among said n integration time segments has a phase difference 360°/n.

2. The operation method of optical sensor of claim 1, wherein said even integration time segments comprise a first integration time segment and a second integration time segment, a time interval between a start time of the first integration time segment and a start time of the second integration time segment is said sampling-time difference, and a time interval between a stop time of the first integration time segment and a stop time of the second integration time segment is said sampling-time difference.

3. The operation method of optical sensor of claim 1, wherein said even integration time segments comprise a first integration time segment, a second integration time segment, a third integration time segment, and a fourth integration time segment, a time interval between a start time of the first integration time segment and a start time of the third integration time segment is said sampling-time difference, and a time interval between a start time of the second integration time segment and a start time of the fourth integration time segment is said sampling-time difference.

4. The operation method of optical sensor of claim 1, wherein said ambient light is influenced by the flicker of an ambient light source, and said flicker frequency obtained by said operation unit corresponds to the flicker of said ambient light source.

5. An operation method of optical sensor, comprising:
 a light-sensing device receiving an ambient light and an operation unit recording a signal generated by said light-sensing device after receiving said ambient light;
 said operation unit obtaining a flicker frequency of said ambient light according to said recorded signal;
 setting signal operation parameters according to said flicker frequency, said operation parameters comprising a sampling-time difference, and said sampling-time difference being a time interval between the start times of two corresponding integration time segments among even integration time segments; and
using said light-sensing device and said operation unit to start an intensity calculation of the ambient light;
 wherein said sampling-time difference set according to said flicker frequency is expressed by:

$$st = \frac{1}{f} \times \left(N + \frac{1}{2}\right)$$

where st is said sampling-time difference; f is said flicker frequency; and N is a natural number.

6. The operation method of optical sensor of claim 5, wherein said even integration time segments comprise a first integration time segment and a second integration time segment, a time interval between a start time of the first integration time segment and a start time of the second integration time segment is said sampling-time difference, and a time interval between a stop time of the first integration time segment and a stop time of the second integration time segment is said sampling-time difference.

7. The operation method of optical sensor of claim 5, wherein said even integration time segments comprise a first integration time segment, a second integration time segment, a third integration time segment, and a fourth integration time segment, a time interval between a start time of the first integration time segment and a start time of the third integration time segment is said sampling-time difference, and a time interval between a start time of the second integration time segment and a start time of the fourth integration time segment is said sampling-time difference.

8. The operation method of optical sensor of claim 5, wherein said ambient light is influenced by the flicker of an ambient light source, and said flicker frequency obtained by said operation unit corresponds to the flicker of said ambient light source.

\* \* \* \* \*